Dec. 14, 1926.
L. SUSSMAN
1,611,087
COOKING UTENSIL
Original Filed Nov. 22, 1923
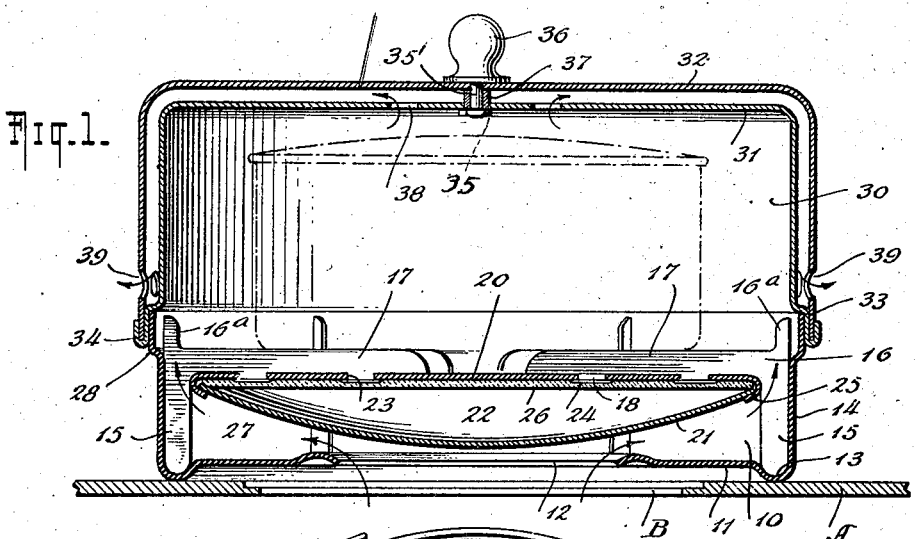
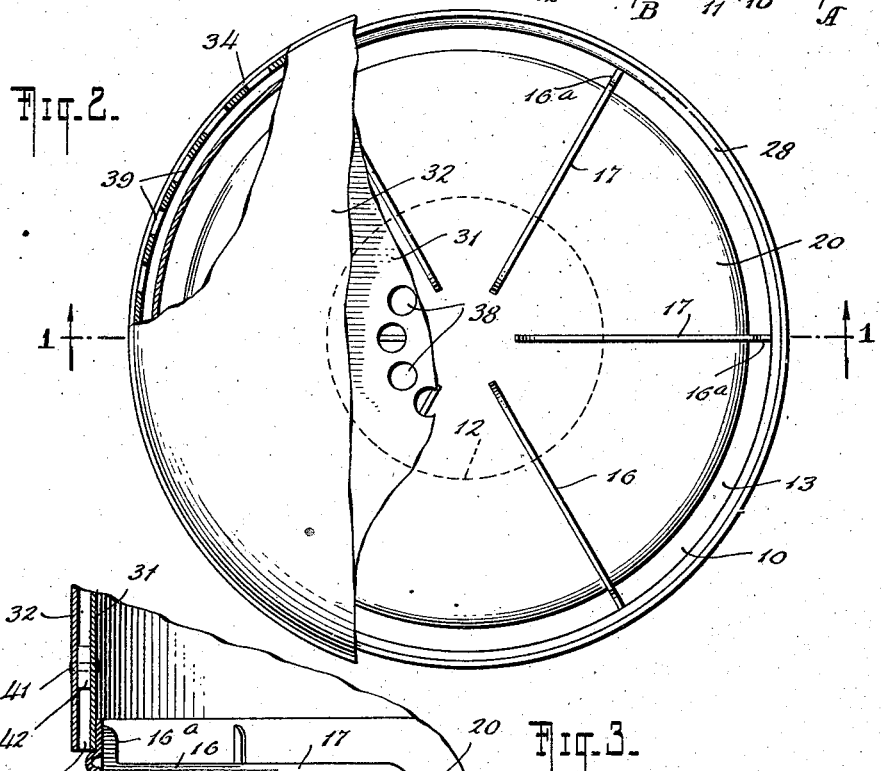
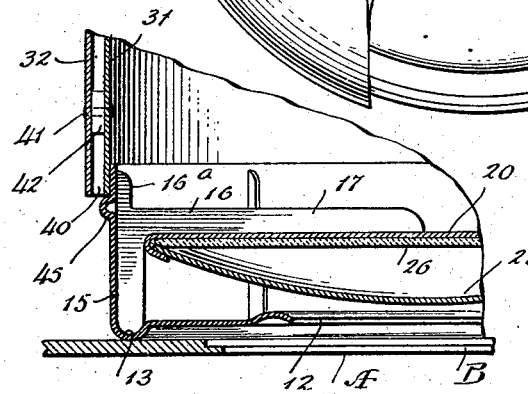
INVENTOR
LEON SUSSMAN
BY
Luka, Kehlenbeck & Mathé
ATTORNEYS Patented Dec. 14, 1926.

1,611,087

UNITED STATES PATENT OFFICE.

LEON SUSSMAN, OF BAYONNE, NEW JERSEY.

COOKING UTENSIL.

Application filed November 22, 1923, Serial No. 676,252. Renewed June 30, 1926.

This invention relates to cooking utensils of the type shown in my prior co-pending application Serial No. 658,851, filed August 23, 1923, and has for its object to improve upon the structure shown in said application by providing a construction of much greater simplicity, thereby not only reducing considerably the manufacturing cost but also producing an article of a much neater and more attractive appearance.

A further object is to provide a cooking utensil having a base member adapted to be placed directly upon a stove or over a gas flame in combination with a cover to confine the hot gases and to construct the cover so as to prevent free egress of the hot gases before they have communicated a large proportion of the heat to the article to be cooked.

Two satisfactory and preferred embodiments of my invention will now be described in detail with reference to the accompanying drawing in which Figure 1 is a central vertical section taken on the line 1—1 of Fig. 2; Fig. 2 is a plan view, some of the parts being shown broken away and some in section and Fig. 3 is a partial view, similar to Fig. 1, of a modification.

As shown in the drawings the reference character A indicates the top of a stove having the aperture B therein for the passage of the hot combustion gases as indicated by the arrows. The cooking utensil comprises a base member 10 preferably constructed of sheet metal pressed or stamped to form an open topped shallow pan-like member, the bottom 11 of which is provided with a central aperture 12 to permit the passage of the hot gases into the utensil. An annular depression 13 is provided in the bottom of the base member 10, adjacent to the vertical flange 14 thereof, to receive the upright legs 15 of the supporting members 16. Said supporting members are provided with horizontal arms 17 which extend perpendicularly to the legs 15 and are provided on their lower faces with a plurality of lugs or ribs 18. A heat distributing member consists of an upper plate 20, which is secured to a concaved lower plate 21 to form therewith a closed hollow chamber 22. The upper plate 20 is provided with a plurality of pairs of radially extending slots 23 in which the lugs or ribs 18 are adapted to engage, said lugs being swaged or riveted as indicated at 24 to secure the supporting members 16 to the upper plate 20 in spaced radially extending positions. After the supporting members are secured to the upper plate 20 the outer rim of said plate is flanged downwardly as at 25 to secure the upper and lower plates together; a sheet 26 of any suitable heat insulating material such as asbestos is interposed between the upper and lower plates to prevent too intense heat from being communicated to the upper plate 20. It will be noted that the upper and lower plates 20 and 21 and the supporting members 16 form a unitary structure when assembled, which is adapted to fit snugly within the base member 10 and to support upon the upper faces of the supporting members 16 a fairly large sized pot or pan in which the food to be cooked is placed, the members 16 being provided with the upwardly projecting ribs 16ᵃ to engage the sides of the pots or pans. The bottom 11 of the base member 10 is pressed inwardly adjacent to the central opening 12 to form a constriction in the passageway 27 defined between the lower plate 21 and the base 10.

The upper edge of flange 14 of the base member preferably is offset outwardly, as at 28, to be engaged by the cover member 30, which consists of an inner section 31 and an outer section 32. The inner section 31 is offset outwardly adjacent to its lower edge to provide a shoulder 33, which is adapted to engage with the upper edge of the flange 14 of base member 10 and limit the downward or telescoping movement of the cover, when it is placed upon the base member. The lower edge of the inner section of the cover is bent backwardly upon itself to form an annular pocket 34 in which the lower edge of the outer section 32 is clamped and the inner and outer sections are secured together by means of a nut 35 and a bolt 35′ which is provided with a handle 36, a sleeve 37 being mounted about the bolt 35′ between the nut and the outer sections to prevent buckling of the sections when the nut 35 is tightened. A row of apertures 38 is provided in the top of the inner section 31 adjacent to the centre thereof and a similar row of apertures 39 is provided in the outer section adjacent to its lower edge.

In the form shown in Fig. 3, instead of holding the inner and outer sections of the cover in spaced relationship by means of the annular pocket 34 which closes the lower end of the air space or heat passageway formed between the cover sections, the space between the inner and outer sections is open to provide an exit passage 40 for the gases as clearly shown in the figure. In this form the apertures 39 are dispensed with and the cover sections are held in spaced relationship by any suitable means such as the rivets 41 and washers 42, which may be located as shown in the drawing adjacent the lower edges of the cover sections or at any suitable points along the sides or tops thereof. Instead of providing the shoulder 33 upon the cover to limit the telescoping movement of the cover and base, I have found it preferable, when the form of cover shown in Fig. 3 is employed, to provide a bead 45 upon the base member to limit such telescoping movement. With the exception of these changes, the construction of the utensil shown in Fig. 3 is identical with that shown in Figs. 1 and 2.

The operation of the device is as follows: The utensil being placed upon the top A of the stove with the opening 13 in registry with the opening B, the hot gases pass through the constricted entrance to the passageway 17, contacting with the lower plate 21 of the heat distributing member, and thence about the circumferential edge of said member into the cover member. As the cover member is in close engagement with the base member the only exit for the gases is through the apertures 38. They are forced to flow about the pot or pan and in so doing a large portion of the heat will be transferred to the pot. After passing through the apertures 38 the gases then flow through the space between the cover sections 31 and 32 and pass out of the openings 39, or through the exit passage 40.

The air chamber 22 in combination with the insulating material 26 effectively prevents the burning or the sticking of contents of the pan to the bottom thereof and insures an even distribution of the heat. The manner in which the gases are caused to circulate within the cover and between the sections thereof insures the greatest possible amount of the heat thereof to be utilized before the gases are allowed to escape.

Various changes in the specific forms shown and described may be made within the scope of the claims without departing from the nature of my invention.

Having thus described my invention I declare that what I claim as new, and desire to secure by Letters Patent of the United States, is:

1. A device of the character described, consisting of a cup-shaped base member and a cover therefor to define a cooking compartment, said base member being provided with a bottom opening to permit ingress of combustion gases to said cooking compartment, a heat deflector having a closed insulating air chamber, a plurality of spaced supporting members secured to said deflector for mounting the same detachably within said base member above said bottom opening, each of said supporting members consisting of a flat vertically extending plate having a horizontal portion extending radially of said deflector and a vertically extending portion, the upper edges of said horizontal portions forming a support for a cooking receptacle to hold the same spaced above said deflector and the vertically extending portions of said members engaging the side walls of said cup shaped base member to hold said deflector in concentric relationship thereto and to said bottom opening; and the under edges of said horizontal portions being provided with projections in interlocking engagement with said deflector to secure said deflector to said supporting members.

2. A device of the character described comprising a shallow cup-shaped base member, and a cover telescopically engaged with said base member to form therewith a cooking compartment, said base member being provided with a concentric bottom opening to permit ingress of combustion gases to said compartment, a supporting stand detachably mounted within said base member, a heat deflector having a closed air chamber secured to said stand, said stand consisting of a plurality of spaced radially extending supporting members, each of said supporting members consisting of a flat vertically extending plate formed to provide a horizontal arm and vertical extensions extending upwardly and downwardly from the outer extremity of said arm, said horizontal arms serving as a support for holding a cooking utensil spaced above said deflector, said upward extensions forming limiting stops for locating a cooking utensil concentrically of said device and said downward extensions forming legs which rest upon the bottom of said base member and engage the side walls thereof to hold said deflector in spaced concentric relationship above said bottom opening.

3. A device of the character described comprising a base member and a cover therefor to define a cooking compartment, said cover being detachably and telescopically mounted on said base member to permit access to said cooking compartment, said base member having an opening in the bottom thereof to permit ingress of combustion gases to said cooking compartment, a heat distributing member having a closed air chamber, supporting means to hold said heat distributing member within said compartment in spaced relationship to the walls thereof and above said opening, said heat distributing member having a curved bottom to cause the combustion gases to be deflected towards the side walls of said cooking compartment, said cover being constructed of a pair of inner and outer cup-shaped sections, provided with co-operating interengaging means for securing said sections together as a unitary structure with the side and top walls thereof in spaced relationship to provide an annular passage extending entirely around the sides of said cover and a top passage extending across the top thereof in communication with said annular passage, said inter section being provided only at the top thereof with an opening to permit the escape of the combustion gases from said cooking compartment to said top passage and said cover being provided with an opening adjacent to the bottom thereof to permit egress of said combustion gases from said annular passage.

In testimony whereof I have hereunto set my hand.

LEON SUSSMAN.